US009657114B2

(12) United States Patent
Chun et al.

(10) Patent No.: US 9,657,114 B2
(45) Date of Patent: *May 23, 2017

(54) ELECTRICALLY CHARGEABLE ENCAPSULATED PARTICLES (75) Inventors: Doris Pik-Yiu Chun, Sunnyvale, CA (US); Hou T. Ng, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 835 days.

This patent is subject to a terminal disclaimer.

(21) Appl. No.: 13/383,706

(22) PCT Filed: Jul. 31, 2009

(86) PCT No.: PCT/US2009/052504
§ 371 (c)(1),
(2), (4) Date: Jan. 12, 2012

(87) PCT Pub. No.: WO2011/014198
PCT Pub. Date: Feb. 3, 2011

(65) Prior Publication Data
US 2012/0129092 A1 May 24, 2012

(51) Int. Cl.
*G03G 9/00* (2006.01)
*B05D 3/00* (2006.01)
(Continued)

(52) U.S. Cl.
CPC .......... *C08F 2/22* (2013.01); *C08F 2/44* (2013.01); *C08F 292/00* (2013.01);
(Continued)

(58) Field of Classification Search
CPC .......... C08F 22/22; C08F 2/44; C08F 292/00; C09B 67/0013; C09B 67/0097;
(Continued)

(56) References Cited

U.S. PATENT DOCUMENTS 5,108,863 A   4/1992 Hsieh et al.
5,346,790 A   9/1994 Sacripante et al.
(Continued)

FOREIGN PATENT DOCUMENTS

WO   2006095995 A1   9/2006
WO   WO-2007134093    11/2007

OTHER PUBLICATIONS

Landfester, Katharina et al., Encapsulated Magnetite Particles for Biomedical Application, Journal of Physics: Condensed Matter, Apr. 7, 2003, vol. 15, 2 pages S1345-S1361, ISSN 1361-648X. See abstract; p. S1349, last paragraph—p. S1351, first paragraph; Figures 2 and 3.

(Continued)

*Primary Examiner* — David Karst
(74) *Attorney, Agent, or Firm* — Dicke, Billig & Czaja, PLLC (57) ABSTRACT Methods of encapsulating particles (260) in polymer (280, 382, 384) and compositions of matter using such encapsulated particles (260). Methods include mixing particles (260) of one or more materials with one or more initial radical polymerizable monomers (265) and one or more initial charge-generating components (270) to form a first suspension of monomer-wetted particles (260/265/270), mixing the first suspension with an aqueous dispersant medium (275) to form a second suspension, adding one or more initial reaction initiators to at least one of the first suspension and the second suspension, subjecting the second suspension to homogenization sufficient to form a stable submicron emulsion having an aqueous continuous phase (275), and reacting available radical polymerizable monomers (265) of the emulsion to encapsulate the particles (260) in one or more layers of polymer (280, 382, 384) and to incorporate ionic species from available charge-generating components (270).

11 Claims, 7 Drawing Sheets (51) Int. Cl.
*A61K 9/16* (2006.01)
*C08F 2/22* (2006.01)
*C08F 2/44* (2006.01)
*C08F 292/00* (2006.01)
*C09B 67/08* (2006.01)
*C09B 67/02* (2006.01)
*C09C 1/56* (2006.01)
*C09D 7/12* (2006.01)
*C09D 11/037* (2014.01)
*C09D 11/32* (2014.01)

(52) U.S. Cl.
CPC ...... *C09B 67/0013* (2013.01); *C09B 67/0097* (2013.01); *C09C 1/56* (2013.01); *C09D 7/1225* (2013.01); *C09D 11/037* (2013.01); *C09D 11/32* (2013.01); *C01P 2004/04* (2013.01)

(58) Field of Classification Search
CPC ....... C09C 1/56; C09D 7/1225; C09D 11/037; C09D 11/32; C01P 2004/04
USPC ......... 523/137; 430/110.2; 427/565; 524/543
See application file for complete search history.

(56) References Cited

U.S. PATENT DOCUMENTS 6,309,787 B1* 10/2001 Cheng .................... 430/137.14
2005/0270628 A1 12/2005 Miyazaki et al.
2007/0227401 A1* 10/2007 Ganschow et al. .......... 106/400
2008/0146448 A1* 6/2008 Dyllick-Brenzinger et al. ............................ 504/358
2008/0275163 A1 11/2008 Liu

OTHER PUBLICATIONS

Mahdavian, Ali Reza et al., Nanocomposite particles with core-shell morphology III: preparation and characterization of nano Al2O3-poly(styrene-methyl 2 methacrylate) particles via miniemulsion polymerization, Polymer Bulletin, Published online Apr. 30, 2009, vol. 63, pp. 329-340. ISSN 1436-2449. See abstract; Experimental; Table 6; Fig. 3 and 4.

Zhang, Sheng-Wen et al. Synthesis of SiO2/Polystyrene Nanocomposite Particles via Miniemulsion Polymerization, Langmuir, Published online May 20, 2005, vol. 2 21, pp. 2124-2128, ISSN 0743-7463. See abstract; Experimental Section; Figures 1-5.

European Search Report for EP Application No. 09847939.7 mailed Aug. 5, 2013 (8 pages).

* cited by examiner

FIG. 5C

ELECTRICALLY CHARGEABLE ENCAPSULATED PARTICLES

BACKGROUND

Pigments are utilized in a variety of applications. When used in electronic applications, such as display devices and printing systems, accumulation of pigment particles on electrical contacts and electrodes can cause electrical shorts or other concerns as many pigments exhibit semiconductor properties.

For the reasons stated above, and for other reasons that will become apparent to those skilled in the art upon reading and understanding the present specification, alternative particle structures for use in electronic and other applications, as well as methods of their preparation, are desirable.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process, chemical or mechanical changes may be made without departing from the scope of the present disclosure. The following detailed description is, therefore, not to be taken in a limiting sense, and the scope of the present disclosure is defined by the appended claims and equivalents thereof.

Various embodiments include the synthesis of polymer-encapsulated particles capable of being reversibly charged in the presence of an electric field. Such particles can be charged (and physically manipulated to move) in the dry state or in an appropriate dielectric medium.

The various embodiments employ high-pressure high-shear homogenization techniques, such as microfluidization, in a sequential process to form homogenously stabilized emulsions. The emulsions include a continuous phase containing water and a discontinuous phase including particles encapsulated in one or more polymerizable monomers and one or more charge-generating components. The emulsions may further include surfactant(s), co-surfactant(s), reaction initiator(s), polymer(s), thickener(s), cross-linker(s) and the like to aid in formation and polymerization of the emulsion. The polymeric encapsulant is formed through reaction of the polymerizable monomers. For some embodiments, the particles have dimensions of less than one micron, which are sometimes referred to as nanoparticles. Embodiments described herein provide a direct yet scalable approach to passivate particles through polymer encapsulation and to incorporate ionic species in the polymer to provide E-field charge capability.

Pigments, such as those that are fused aromatic or extensively p-conjugated, are often semiconducting and hence their accumulation on electrodes (e.g., conductive electrodes in display devices and printing systems) can lead to shorted circuitry and other undesirable effects. By passivating the pigment surface with polymer, one can improve device lifetime and performance by preventing short-circuit problems. In addition, the incorporation of ionic species, e.g., various salts of organic acids, can introduce and/or improve particle charging capability and uniformity to any encapsulated particle, and hence promote movement of the particle across an electric field due to enhanced attraction/repulsion.

Various embodiments include methods of encapsulating particles, e.g., nanoparticles, in a chargeable polymer encapsulant. The methods include mixing the particles in the presence of one or more polymerizable monomers and one or more charge-generating components. Such mixing serves to wet the surfaces of the particles with at least the monomers. The particles can include one or more colorants, such as organic pigments, e.g., CuPc-based (copper phthalocyanine-based) and carbon black pigments, and inorganic pigments, e.g., titanic- or silica-based pigments. Such embodiments containing colorants can be used in the formulation of marking fluids for inkjet printing systems, toners for liquid electrographic printing systems, or in display devices. The particles may further include other solids, such as quantum dots, metal oxides, colloids, pharmaceuticals, etc. for a variety of other applications. For various embodiments, the particles may be mixed in the presence of the polymerizable monomer mixture and the charge-generating component(s) along with one or more additional reagents, such as reaction initiator(s), polymer(s), thickener(s), cross-linker(s) and the like to aid in formation and polymerization of the subsequent emulsion, or to modify the properties of the end product.

The methods further include adding an aqueous dispersant medium, such as water and surfactant(s), to the solids/monomer/charge-generating component mix and subjecting the resultant heterogeneous mixture to microfluidization or other such homogenization until a stable submicron emulsion is obtained. The process conditions of the microfluidization and materials loading can be adjusted to obtain a particular particle size having a specific colorant-to-monomer ratio in the solids/monomer mix within the aqueous continuous phase. The emulsion is then subjected to reaction initiation. For some embodiments, this reaction is initiated with insufficient reaction initiator in the initial emulsion to complete polymerization of the available monomer to produce polymer "seed" particles and to provide control of the polymerization reaction. Additional reaction initiator is then added to complete the polymerization. Such further addition of initiator can be performed over a period of time with or without the addition of further monomer mix. Using monomer-starved conditions, the thickness of the polymer encapsulant can be built up in a controlled manner. That is, the reaction can begin to encapsulate the particles in polymer, and then additional monomer can be added to continue to feed the reaction, resulting in further growth of the polymer encapsulant. In addition, by altering the monomer composition over time, the composition of the resulting polymer encapsulant can be altered in response to the monomer composition at the time of reaction.

For charging in a dielectric medium, the methods may further include removing water from the reaction product to isolate the encapsulated particles, such as by freeze drying, evaporation or solvent exchange, and dispersing the encapsulated particles in the dielectric medium with a charging agent. The dielectric medium can be any dielectric fluid. For example, the dielectric medium could be a fluid exhibiting $10^7$ to $10^9$ ohms/cm$^2$. Some examples of a dielectric medium include long chain aliphatics, silicone oil, soybean oil, and limonene. The charging agent can be any material capable of bearing a charge that are soluble in the dielectric medium. Some examples of charging agents include lecithin, organic species forming charged micelles, surfactants and hyperdispersants. Because of their steric hindrance, hyperdispersants will aid wetting and stabilizing of pigments, and help to reduce sedimentation.

Figure 1:
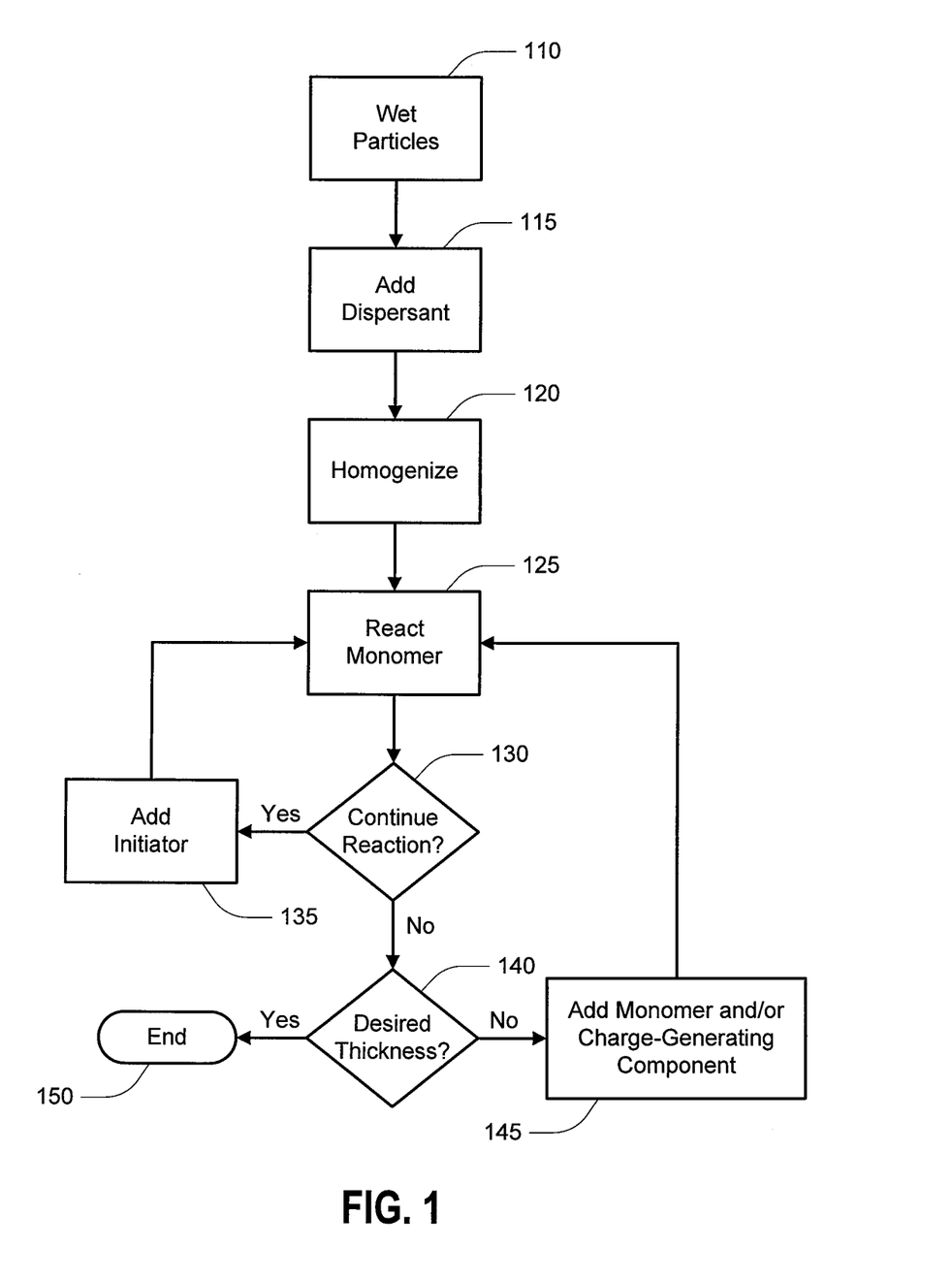
FIG. 1 is a flowchart of a method of forming encapsulated particles in accordance with an embodiment of the disclosure.
Figure 2A:
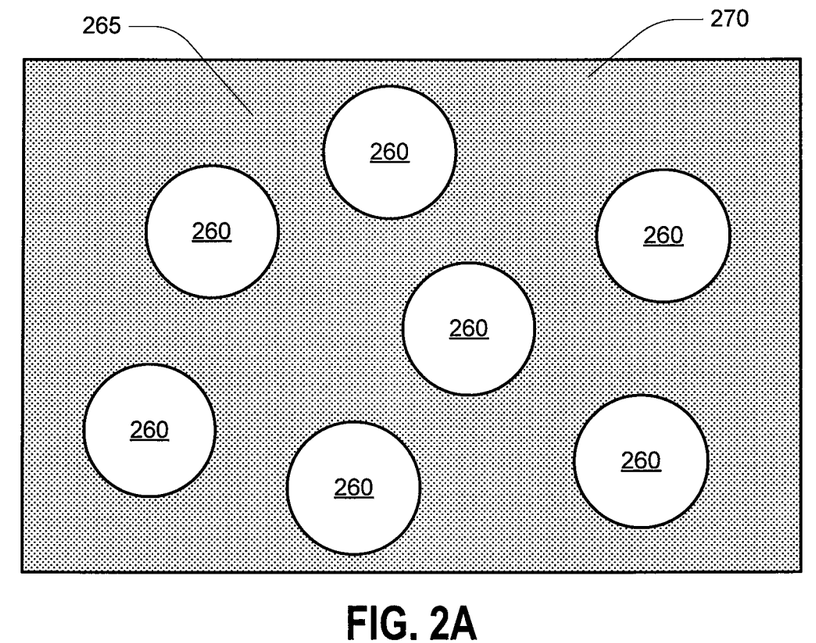
FIGS. 2A-2C are representations of process mixtures at various stages of the method of FIG. 2.

FIG. 1 is a flowchart of a method of forming encapsulated particles in accordance with an embodiment of the disclosure. Mechanical mixing of at least the particles, one or more polymerizable monomers and one or more charge-generating components, which is typically used between 0.1 to 25 wt % of the monomers, is performed at 110 to wet the particles with at least the monomers, forming a suspension. Such mixing may further be performed in combination with shearing, such as through grinding, milling or otherwise inducing shear, to cause a reduction in the average particle size of the particles and to aid in surface wetting of the particle surfaces. FIG. 2A is a representation of particles 260 wetted in monomer 265 and charge-generating component 270. Note that the reference numbers for monomer 265 and charge-generating component 270 each relate to the bulk phase as these materials would be intermixed.

The particles may include one or more materials. For example, the particles may represent a single material or a mixture of two or more different materials. The particle materials include, for example, organic or inorganic pigments or other colorants, quantum dots, metal oxides, colloids, etc. The particles are generally in dried form. Binders may be added to aid in wetting the surfaces of the particles. For example, a halogenated aromatic solvent may be added if the particles are incompatible with the monomers to improve the wettability of their surfaces.

The one or more polymerizable monomers can include any radical-polymerizable monomer, and the choice will depend upon the desired characteristics of the resulting polymer encapsulant. Radical polymerization is a type of polymerization in which the reactive center of a polymer chain consists of a radical. Some examples of monomers could include radical polymerizable acrylic and methacrylic monomers such as linear, branched cyclic saturated or unsaturated aliphatic acrylates including but not limited to ethyl, propyl, isobutyl, butyl, tertarylbutyl, pentyl, hexyl, heptyl, octyl, nonyl, decyl, dodecyl, octadecyl, 2-ethylhexyl, lauryl, cyclohexyl, tbutylcyclohexyl acrylates and styrene. Blends of these monomers with heteroatom-containing functional monomers can also be used to affect and adjust the desired latex properties. These monomers may include examples such as 2-hydroxyethyl, 2-hydroxylpropyl, 2-hydroxylbutyl, dimethylaminoethyl, glycidyl, butanediol, 2-carboxylethyl, 2-ethoxyethyl, di(ethylene glycol methyl ether, ethylene glycol methyl ether, ethylene glycol phenyl ether, 2-(4-benzoyl-3-hydroxyphenoxy)ethyl, 2-(dialkylamino)ethyl, 2-(dialkylamino)propyl, 2-[[(butylamino) carbonyl]-oxy]ethyl, 2-hydroxyl-3-phenoxypropyl, 3,5,5-trimethylhexyl, 3-(trimethyloxysilyl)propyl, 3-sulfopropyl, di(ethylene glycol)-2-ethylhexyl ether, dipentaerythritol penta-/hexa, ethyl 2-(trimethylsilylmethyl), ethyl-2-(trimethylsilylmethyl), alkylcyano, ethylene glycol dicyclopentenyl ether acrylates.

The one or more charge-generating components can include a variety of materials capable of generating a charge. Some examples of charge-generating components can include compounds containing alkylammonium salts, protonated amines, metals (transition, alkali, complex) salt(s) of monoprotic polyprotic acids including but not limited to carboxylic acids, phosphoric acids, sulfonic acid, sulfinic acid, sulfuric acid, sulfamic acid, nitric acid, boronic acid, perchloric acid, and aromatic acids such as benzoic acid, naphthalic acid, phenols, toluenesulfonic acid, phenylphosphonic acid and benzenesulfonic acid.

By grinding or otherwise shearing pigment (which may be surface treated, chemically treated, or raw) with the monomer/charge-generating component blend, each discrete pigment particle can be brought into physical contact with at least the monomers. Due to the association of similar surface energies among the pigment particle surfaces and monomers arising from non-covalent interactions including but not limited to Van der Waals, hydrogen-bonding, acid-base, Zwitterionic, and static interactions, the monomers can coat the pigment particle surfaces. There are two advantages associated with this method of monomer coating. First, it mediates the assembly of the pigment with the surfactant(s) of choice to form the final stable emulsion. Second, it facilitates the complete coverage of the individual pigment particles which will polymerize upon chemical, redox (reduction/oxidation) or thermal initiation to form a surrounding polymer encapsulant.

Reaction initiators and other reagents may also be added at 110 and thus to this first suspension, which may form a paste upon mixing. Example reaction initiators include water miscible or immiscible radical generators, including diazocompounds, peroxides, and redox initiators. Other reagents may include crosslinkers, co-surfactants (hydrophobic), rheology-control agents, chain transfer agents, RAFT (Reversible Addition-Fragmentation chain Transfer) agents (e.g. dithioesters), and non-aqueous solvents (e.g., halogenated/aromatic solvents) to affect the efficiency and quality of the reaction.

An aqueous dispersant medium is added to the first suspension at 115. The dispersant medium may include water and one or more surfactants or co-surfactants. As one example, the dispersant medium may contain 0.01 to 50 wt % of surfactant in water. Suitable surfactants and co-surfactants will depend upon the choice of monomers. Any desired reaction initiators and/or other reagents not added at 110 may be added at this time. The resulting mixture may further be mixed at this time. For example, the mixture may be subjected to high speed mixing, e.g., >500 rpm, for 0.01-10 hours to form a second suspension. For some embodiments, initiator(s) added at 110 and/or 115 are added at a quantity that is insufficient to completely react the initial available monomers.

Figure 2B:
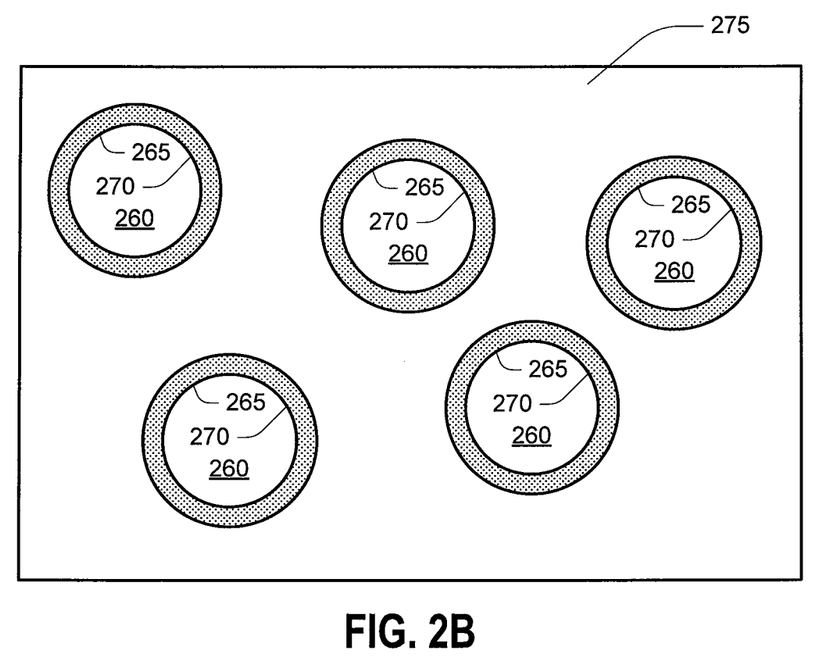

The resulting second suspension is then subjected to homogenization, such as microfluidization, at 120. Microfluidization, as used herein, is the formation of submicron emulsions, i.e., emulsions having discontinuous phase droplets having dimensions of less than one micron. Example lab-scale dispersion apparatus for developing submicron emulsions include the VIBRACELL SONIC VCX-750 ultrasonifier and the MICROFLUIDICS Model 110-Y microfluidizer. Example industrial-scale dispersion apparatus for developing submicron emulsions include the HIELSCHER UIP4000 ultrasonicator or the MICROFLUIDICS Model M-710 series microfluidizers. Other homogenizers capable of forming submicron emulsions of the monomer-coated particles in an aqueous continuous phase may also be used. Adjusting the process conditions of homogenization, including operating conditions and equipment setup, can be used to further break down particles into a desired average size of the monomer-wetted particles in the aqueous continuous phase and/or control the degree of deagglomeration of monomer-wetted particles in the aqueous continuous phase. For example, control can be affected through variation of the amount of surfactant, the pressure for a homogenizer or amplitude of a sonifier probe, cycles of fluidization, microfluidizer chamber types and diameters, arrangements of microfluidizer interaction chamber versus auxiliary process module, etc. Particle composition within the agglomerates would be statistically based on the size of the particles and the weight ratios of component particles. FIG. 2B is a representation of an emulsion having an aqueous continuous phase 275, i.e., the aqueous dispersant medium, and a discontinuous phase having particles 260 encapsulated in the monomer/charge-generating component blend 265. Particles 260 encapsulated in monomer/charge-generating component blend 265 represent the discontinuous phase droplets, and would have dimensions of less than one micron.

The emulsion from 120 is then subjected to reaction initiation, e.g., controlled chemical, redox or thermal initiation, to begin to polymerize the available monomers at 125. The reaction conditions will be dependent upon the chosen monomers and initiators, but example conditions include 35-100° C. for 0.01 to 15 hours at atmospheric pressures for thermal initiation. Depending on the reaction kinetics, polymerization is typically performed in a controlled environment. For example, regular or purified water can be degassed, deionized, or distilled along with an initial purge in an N2 and/or Ar2 atmosphere to reduce oxygen content of the reaction.

Figure 2C:
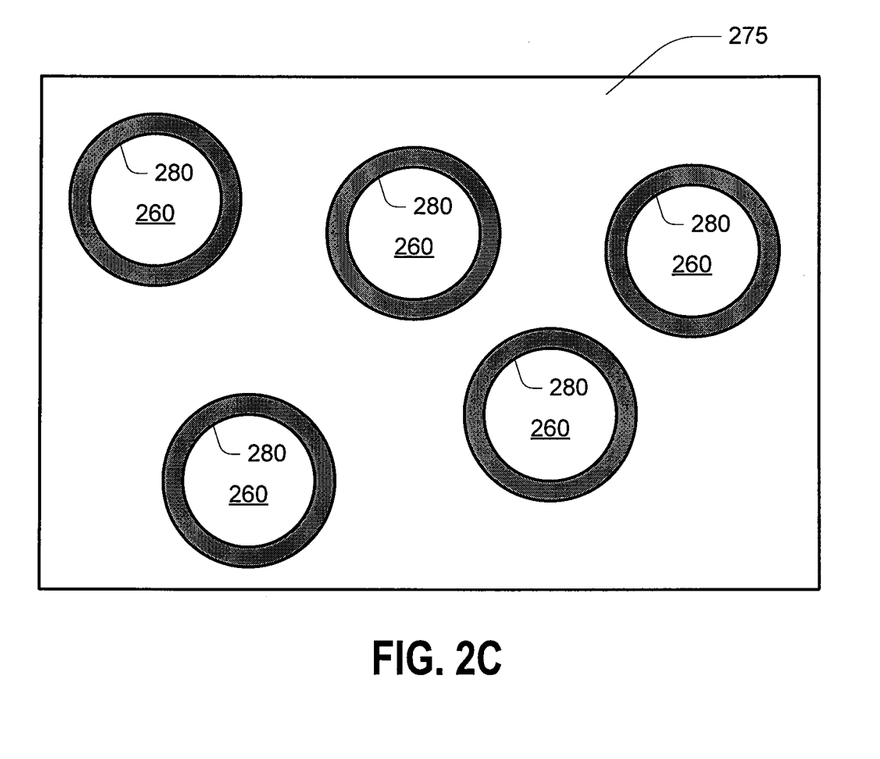

If it is desired to continue to drive the reaction at 130, e.g., when available reaction initiators are insufficient to fully react all available monomers, one or more additional reaction initiators can be added at 135. The degree of reaction completion can be determined by monitoring the monomer/polymer ratio of the reaction mixture or monitoring the rate of heat generation during the exothermic reaction. Additional reaction initiator may be added, for example, when the reaction times have exceeded the half-life of the initiator. Alternatively, additional initiator may be added in a controlled manner, such as adding particular quantities of initiator at particular intervals determined to maintain a desired reaction rate until a quantity of initiator has been added that is expected to cause complete consumption of the available monomers. FIG. 2C is a representation of a resulting reaction product after the available monomers in the monomer/charge-bearing component blend 265 are reacted, and having an aqueous continuous phase 275 and a discontinuous phase having particles 260 encapsulated in a polymer 280. The polymer 280 incorporates one or more ionic species from the charge-generating component(s) capable of accepting a charge.

If the reaction is complete at 130, the process proceeds to 140. It is noted that reaction completion at 130 does not require complete consumption of available monomers. It only means that under the current reaction conditions, there is no longer a desire to drive the reaction through the addition of further initiator.

If the monomers of step 110 are sufficient to produce a desired encapsulant thickness at 140, the process may end at 150. In certain applications, such as inkjet printing, a weight ratio of polymer encapsulant to encapsulated solids of greater than one may be desired. However, combining sufficient monomer with the particles to produce such a weight ratio can lead to undesirable uniformity in the resulting polymer encapsulant. For example, the likelihood of monomer particles not containing a solid particle increases, leading to the formation of particle-free polymer, or the variation of polymer thickness from particle to particle may be increased. Thus, various embodiments mix an insufficient amount of monomer with the particles initially to reduce the likelihood of such particle-free polymer or undesirable thickness variability, and build subsequent polymer thickness using monomer-starved feeding conditions. Accordingly, if the monomers added at 110 are not sufficient to produce a desired encapsulant thickness at 140, one or more additional monomers and one or more additional charge-generating components are added at 145. The additional monomer at 145 can include the same one or more monomers and the same one or more charge generating components used at step 110 to continue budding the polymer encapsulant having the same composition. Alternatively, the additional monomer and additional charge-generating component at 145 can include at least one monomer not used at step 110 and/or at least one charge-generating component not used at step 110, such that a layer of different polymer is formed on the prior polymer layer. This process can be repeated until a desired thickness of the desired one or more polymer compositions is formed around the particles. The additional monomer at 145 may be added in a controlled manner such as found in monomer-starved polymerization processing. For example, the additional monomer may be added periodically via a syringe pump or the like, or continuously via a rotary feed pump or the like. Such monomer-starved conditions can facilitate a near elimination of particle-free polymer in the resultant reaction product. The additional charge-generating component at 145 may be added in proportion to the addition of the additional monomer. It is further noted that the addition of initiator at 135 and the addition of monomer at 145 may occur concurrently, and the addition of monomer at 145 may occur before the available monomer of the reaction mixture is fully consumed. The addition of monomer at 145 can be neat monomers, i.e., pure or in their commercially-available form, or a stabilized aqueous emulsion of monomers.

Figure 3A:
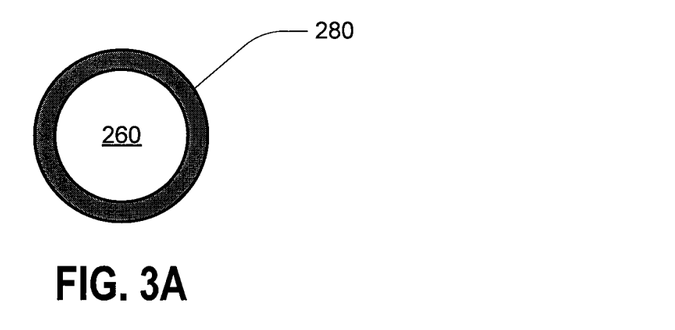
FIGS. 3A-3C are representations of an encapsulated particle having one or more layers of encapsulant material in accordance with embodiments of the disclosure.
Figure 3B:
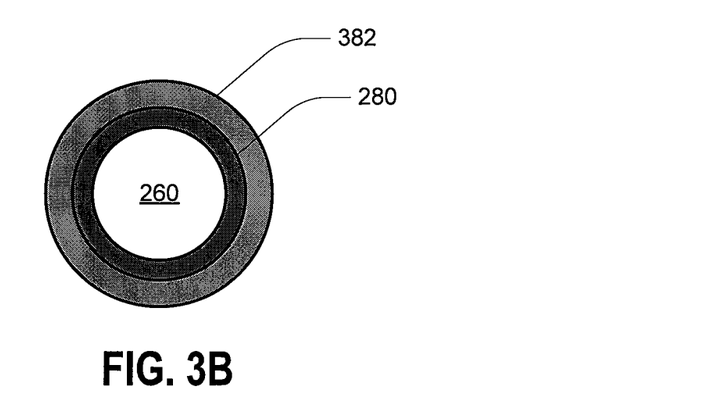
Figure 3C:
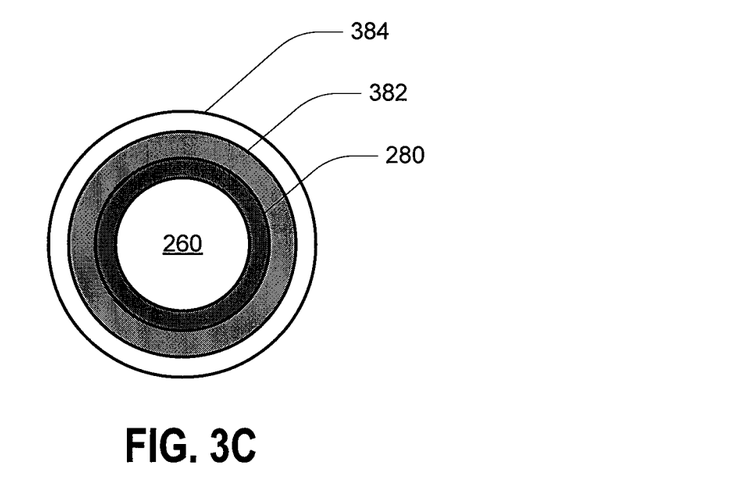
Figure 4A:
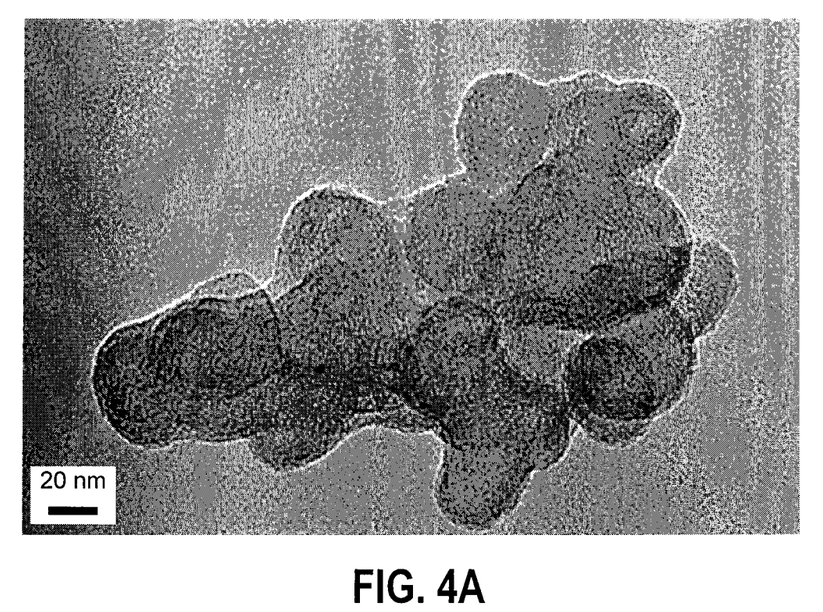
FIGS. 4A-4D are transmission electron micrograph (TEM) images of encapsulated particles produced in accordance with embodiments of the disclosure.
Figure 4B:
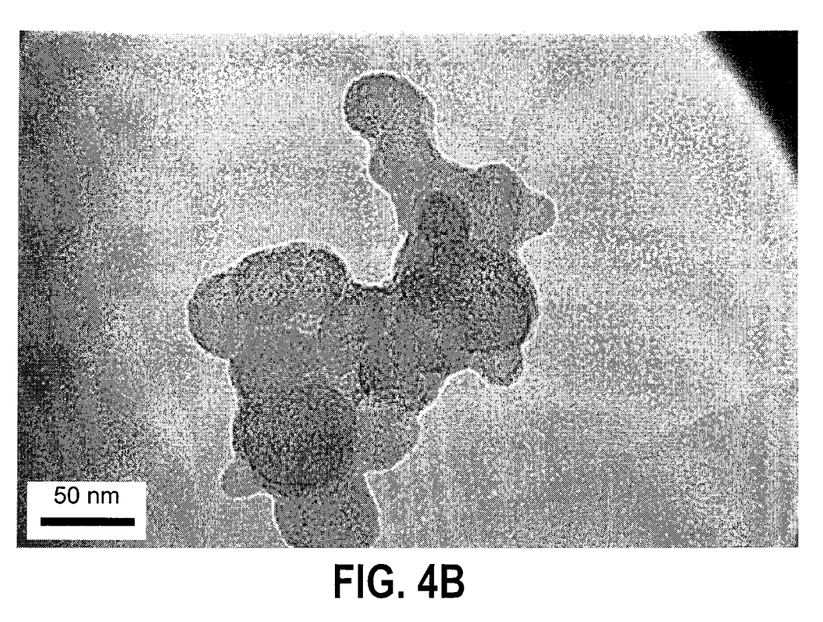
Figure 4C:
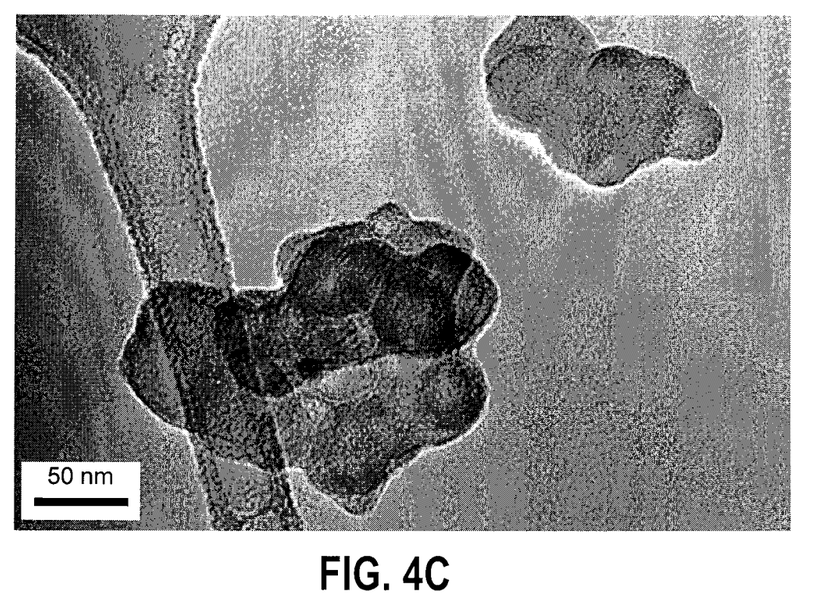
Figure 4D:
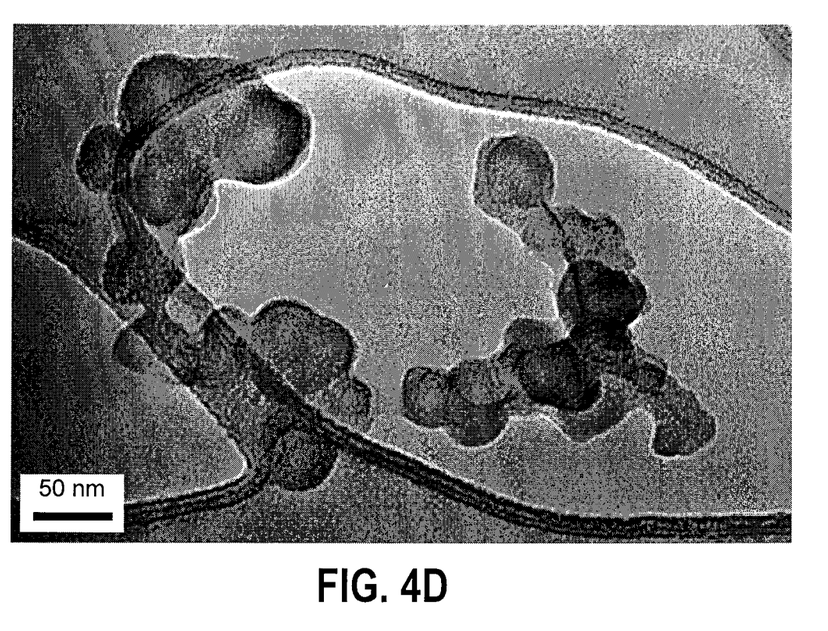

The formation of a polymer encapsulant having varying compositions is depicted in FIGS. 3A-3C. In FIG. 3A, a particle 260 is encapsulated by a polymer 280. Such an encapsulated particle may be obtained by following the process of FIG. 1 and using the same monomers) at 145 as were used at 110. In FIG. 36, a particle 260 is encapsulated by a first polymer 280 having a first composition, which is then encapsulated by a second polymer 382 having a second composition different from the first composition. Such an encapsulated particle may be obtained by following the process of FIG. 1 and making a change in the monomer composition and/or charge-generating component composition at 145 after a desired thickness of polymer 280 is obtained. In FIG. 3C, a particle 260 is encapsulated by a first polymer 280 having a first composition, which is then encapsulated by a second polymer 382 having a second composition different from the first composition, which is then encapsulated by a third polymer 384 having a third composition different from the second composition. Such an encapsulated particle may be obtained by following the process of FIG. 1, making a change in the monomer composition and/or charge-generating component composition at 145 after a desired thickness of polymer 280 is obtained, and making another change in the monomer composition and/or charge-generating component composition at 145 after a desired thickness of polymer 382 is obtained. Note that the composition of the third polymer 384 may be the same or different than the composition of the first polymer 280. This process can be repeated to form yet additional polymer layers. For some embodiments, charge-generating component is eliminated from one or more, but less than all, layers. For example, for one embodiment, only the third polymer 384 of FIG. 3C is formed using a charge-generating component, such that the ionic species are only incorporated into that layer.

The following examples represent processes used to form encapsulated particles in accordance with various embodiments of the disclosure.

Example 1

To a 50 mL mixture of acrylic monomers (styrene/methylmethacrylate/2-ethylhexylacrylate, 15:65:20) was added 0.5 g of oil-soluble initiator AIBN (Azobisisobutyronitrile), 50 mg of dodecylrnercaptan as a chain transfer agent, 0.5 g of hexadodecane as a stabilizer, and 0.15 g of aluminum stearate as a charge-generating component. The monomer mixture was pasted together with 50 g of carbon black. DEGUSSA PRINTER 25 in a 2 L Erlenmeyer flask. 1 L of a degassed deionized aqueous solution containing 2 wt % sodium dodecylsulfate was added at once to the pigment paste. The heterogeneous mixture underwent primary dispersion by mechanical stirring at 1000 rpm for 30 minutes under a stream of argon, and was then further dispersed by microfluidization in a MICROFLUIDICS Model 110-Y at 60-80 applied psi (an internal shear pressure of approximately 20 kpsi) with an 87 micron interaction chamber. The solution cycled through 3 times and was then collected into a reactor equipped with 2 impellers, a stirring mechanism, a condenser, and purged with argon for 5 minute prior to the thermally initiated polymerization at 80° C. The reaction proceeded for 8 hours under argon. Upon completion of the reaction, the dispersion was allowed to cool to room temperature. The dispersion was screened through a 10 micron aluminum screen to remove larger particulates, and it then underwent a quick freeze in liquid nitrogen and subsequent lypholization (freeze drying) to remove excess water, which left behind dry encapsulated carbon black. This pigment powder was then redispersed by ultrasonication (20 kHz, 1 second pulse on and 3 seconds off for 1 minute, with cooling) in ISOPAR L making a 5 wt % solid content. Additional hyperdispersant such as SOLSPERSE 19000 was subsequently added to the organic dispersion at 5 wt % to form an encapsulated pigment dispersion responsive to an applied electrical field.

Example 2

To a 30 mL mixture of acrylic monomers (styrene/methylmethacrylate/hexyl methacrylate, 40:40:20) was added 0.4 g of oil-soluble initiator AIBN, 40 mg of dodecylmercaptan, 0.5 g of hexadodecane, and 0.15 g of aluminum stearate. The monomer mixture was pasted together with 30 g of carbon black DEGUSSA XPB 308 in a 1 L Erlenmeyer flask. 0.5 L of a degassed deionized aqueous solution containing 2 wt % sodium dodecylsulfate and 1 wt % of Tergitol 15-S-30 was added at once to the pigment paste. The heterogeneous mixture underwent primary dispersion by a probe homogenizer (IKA ULTRA TURRAX T25) at 11 k rpm at 5 second intervals for 1 minute, and then a secondary dispersion by microfluidization in a MICROFLUIDICS Model 110-Y at 60-80 applied psi (an internal shear pressure of approximately 20 kpsi) with an 87 micron interaction chamber. The solution cycled through 3 times and was then collected into a reactor equipped with 2 impellers, a stirring mechanism, a condenser, and purged with argon for 5 minute prior to the thermally initiated polymerization at 80° C. The reaction proceeded for 8 hours under argon and subsequent quenching with 5 mL of 0.1 M hydroquinone in water completed the reaction. The dispersion was then allowed to cool to room temperature. The dispersion was screened through a 10 micron aluminum screen to remove larger particulates, and it then underwent a quick freeze in liquid nitrogen and subsequent lypholization (freeze drying) to remove excess water, which left behind dry encapsulated carbon black. This pigment powder was then redispersed by ultrasonication (20 kHz, 1 second pulse on and 3 seconds off for 1 minute, with cooling) in ISOPAR L making a 5 wt % solid content. Additional hyperdispersant such as SOLSPERSE 19000 was subsequently added to the organic dispersion at 5 wt % to form electric-field responsive encapsulated pigments.

FIGS. 4A-4D are transmission electron micrograph (TEM) images of encapsulated particles produced in accordance with embodiments of the disclosure. Note that the branch-like structure is an anomaly of the TEM apparatus, and does not represent any encapsulated particles.

Figure 5A:
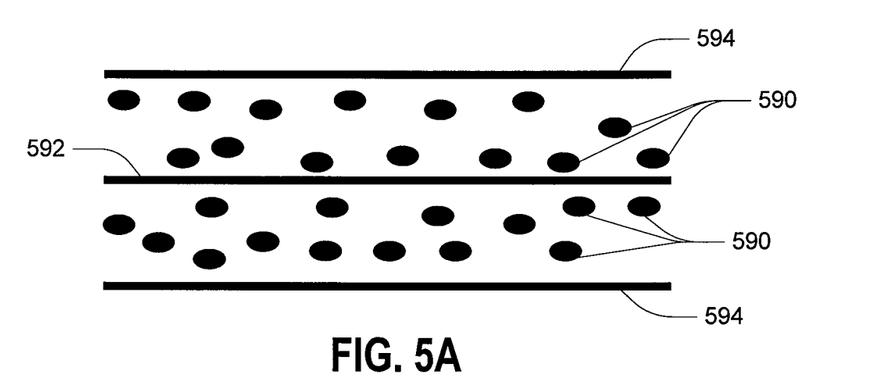
FIGS. 5A-5C are schematics demonstrating the concept of an experiment performed on encapsulated particles produced in accordance with an embodiment of the disclosure.
Figure 5B:
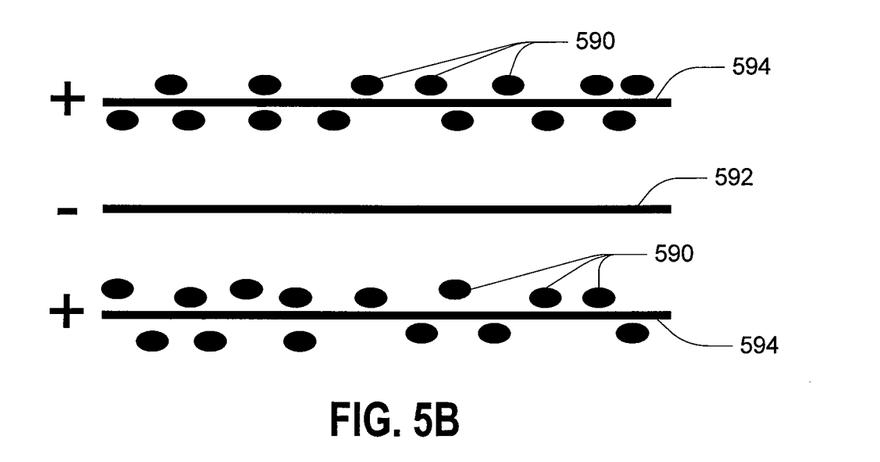
Figure 5C:
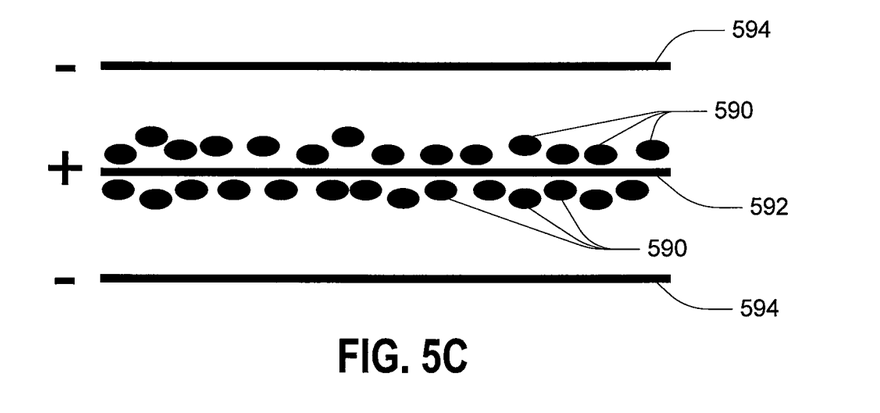

Embodiments utilizing carbon black pigments as the particles have been tested for their responsive behavior under an electric field. Such pigments did respond to the applied field and moved across from one electrode to another. FIGS. 5A-5C are schematics demonstrating the concept of the experiment. In FIG. 5A, encapsulated particles 590 are placed in proximity to first electrode 592 and second electrodes 594 under a neutral electric field. In FIG. 5B, an electric field is generated by placing a negative charge on the first electrode 592 and a positive charge on the second electrodes 594. In this instance, negatively-charged encapsulated particles 590 were driven toward the positively-charged second electrodes 594

Various embodiments described herein are applicable to a wide range of nanoparticles of any shape. In addition, the various embodiments can tolerate wide variations in surface properties of the nanoparticles.

Although specific embodiments have been illustrated and described herein it is manifestly intended that the scope of the claimed subject matter be limited only by the following claims and equivalents thereof. For example, solvent may be added to a monomer/pigment blend to facilitate the salvation of pigment into the monomer. Under such conditions, the resulting polymer could appear colored even without the encapsulation of any discrete pigment particle. The advantage from such a process is the improvement on optical density arising from colored pigment-free polymer.

What is claimed is:

1. A method of encapsulating particles in polymer, comprising:
mixing particles of one or more materials with one or more initial radical polymerizable monomers and one or more initial charge-generating components to form a first suspension of monomer-wetted particles;
after forming the first suspension, mixing the first suspension with an aqueous dispersant medium to form a second suspension;
adding one or more initial reaction initiators to at least one of the first suspension and the second suspension;

subjecting the second suspension to homogenization sufficient to form a stable submicron emulsion having an aqueous continuous phase; and reacting available radical polymerizable monomers of the emulsion to encapsulate the particles in one or more layers of polymer and to incorporate ionic species from available charge-generating components.

2. The method of claim 1, wherein mixing particles of one or more materials with one or more initial radical polymerizable monomers and one or more initial charge-generating components further comprises mixing particles of one or more materials with one or more initial radical polymerizable monomers and one or more initial charge-generating components, and at least one additional reagent selected from the group consisting of a reaction initiator, a cross-linker, a co-surfactant, a rheology-control agent, a chain transfer agent, a dithioester and a non-aqueous solvent.

3. The method of claim 1, wherein mixing particles of one or more materials with one or more initial radical polymerizable monomers and one or more initial charge-generating components further comprises shearing the first suspension sufficient to cause a reduction in average particle size of the particles.

4. The method of claim 1, further comprising:
adding one or more additional reaction initiators while reacting the available radical polymerizable monomers of the emulsion.

5. The method of claim 1, further comprising:
adding one or more additional radical polymerizable monomers to the emulsion;
adding one or more additional charge-generating components to the emulsion; and
continuing to react the available radical polymerizable monomers of the emulsion.

6. The method of claim 5, wherein adding one or more additional radical polymerizable monomers comprises adding at least one radical polymerizable monomer that is different than any of the one or more initial radical polymerizable monomers.

7. The method of claim 5, wherein adding one or more additional charge-generating components comprises adding at least one charge-generating component that is different than any of the one or more initial charge-generating components.

8. The method of claim 1, further comprising:
adding one or more additional reaction initiators while reacting the available radical polymerizable monomers of the emulsion;
adding one or more additional radical polymerizable monomers to the emulsion while reacting the available radical polymerizable monomers of the emulsion; and
adding one or more additional charge-generating components to the emulsion while reacting the available radical polymerizable monomers of the emulsion;
wherein adding one or more additional reaction initiators, adding one or more additional radical polymerizable monomers and adding one or more additional charge-generating components occur concurrently while continuing to react the available radical polymerizable monomers of the emulsion.

9. The method of claim 1, further comprising adjusting the homogenization process conditions to obtain a particular degree of deagglomeration of the monomer-wetted particles in the aqueous continuous phase.

10. The method of claim 1, further comprising adjusting the homogenization process conditions to obtain a particular average size of the monomer-wetted particles in the aqueous continuous phase.

11. The method of claim 1, wherein subjecting the second suspension to homogenization comprises processing the second suspension in an apparatus selected from the group consisting of a homogenizer, an ultrasonifier, a microfluidizer and an ultrasonicator.

* * * * *